(12) United States Patent
Känsäkoski et al.

(10) Patent No.: US 9,335,834 B2
(45) Date of Patent: May 10, 2016

(54) ELECTRONIC FLUIDIC INDICATOR AND METHOD OF INDICATING

(75) Inventors: Markku Känsäkoski, Oulu (FI); Antti Kemppainen, Oulu (FI)

(73) Assignee: TEKNOLOGIAN TUTKIMUSKESKUS VTT OY (FI)

( * ) Notice: Subject to any disclaimer, the term of this patent is extended or adjusted under 35 U.S.C. 154(b) by 461 days.

(21) Appl. No.: 13/519,986

(22) PCT Filed: Dec. 31, 2009

(86) PCT No.: PCT/FI2009/051051
§ 371 (c)(1),
(2), (4) Date: Sep. 20, 2012

(87) PCT Pub. No.: WO2011/080374
PCT Pub. Date: Jul. 7, 2011

(65) Prior Publication Data
US 2013/0002438 A1  Jan. 3, 2013

(51) Int. Cl.
*G08B 21/00* (2006.01)
*G06F 3/03* (2006.01)

(52) U.S. Cl.
CPC ........................................ *G06F 3/03* (2013.01)

(58) Field of Classification Search
None
See application file for complete search history.

(56) References Cited

U.S. PATENT DOCUMENTS

| | | | |
|---|---|---|---|
| 7,332,902 B1 * | 2/2008 | Vermeire et al. | 324/71.4 |
| 2003/0156998 A1 * | 8/2003 | Gilligan et al. | 422/102 |
| 2009/0178935 A1 * | 7/2009 | Reymond et al. | 205/777.5 |
| 2012/0273353 A1 * | 11/2012 | Chow et al. | 204/452 |
| 2013/0017609 A1 * | 1/2013 | Kansakoski et al. | 436/1 |

FOREIGN PATENT DOCUMENTS

| | | |
|---|---|---|
| EP | 1336431 A2 | 8/2003 |
| JP | 49-104167 | 10/1974 |
| WO | WO-99/03584 A1 | 1/1999 |

(Continued)

OTHER PUBLICATIONS

International Search Report for PCT/FI2009/051051 mailed Sep. 13, 2010.
Office Action issued Oct. 7, 2013 in corresponding Japanese Patent Application No. 2012-546472.
English translation of Search Report for Chinese patent application No. 200980163220.3 dated May 4, 2014.

*Primary Examiner* — Julie Lieu
(74) *Attorney, Agent, or Firm* — Drinker Biddle & Reath LLP (57) ABSTRACT

The invention relates to providing detection of an exposure to a physical or chemical phenomenon and revealing information as a response to the exposure. A microfluidic device (20) comprises a microchannel (22) filled at least partly with at least one substance and a conductor (29) providing an intersection area (23a-23d) with the microchannel (22). As a result of exposure to the physical or chemical phenomenon directed to the microchannel (22) or to the substance in the microchannel (22) the microfluidic device (20) is arranged to control electromagnetic characteristic of the conductor (29) in the intersection area (23a-23d). An indicator device (45) comprises the microfluidic device (20) that is connected to means for indicating (40) to indicate the exposure to the phenomenon by giving a visual, sound, scent and/or electhcomagnetic indication. Further a method for detecting exposure to a physical or chemical phenomenon and indicating the exposure is presented.

19 Claims, 6 Drawing Sheets

(56) References Cited

FOREIGN PATENT DOCUMENTS

| WO | WO-2008107871 | A1 | 9/2008 |
| WO | WO 2009/014390 | A2 | 1/2009 |
| WO | WO-2009014390 | A2 | 1/2009 |

* cited by examiner

ELECTRONIC FLUIDIC INDICATOR AND METHOD OF INDICATING

PRIORITY

Priority is claimed as a national stage application, under 35 U.S.C §371, to PCT/FI2009/05105, filed Dec. 31, 2009. The disclosure of the aforementioned priority application is incorporated herein by reference in its entirety.

TECHNICAL FIELD OF THE INVENTION

This invention relates to a device that reveals information as a response to a physical or chemical phenomenon being exposed to the device. More particularly, the invention relates to a microfluidic device that responds to an exposure caused by the phenomenon by generating a response, an indicator device that upon exposure indicates information thereof, and a method of detecting such a phenomenon and indicating information thereof.

BACKGROUND OF THE INVENTION

Security of the packages is important, since product counterfeiting is a multi billion business and the brand owners lose annually large sums of money with counterfeit products. For example in the US alone more than 1.2 billion DVDs are sold every year. In packages, the most common security solution is the hologram, which is however relatively easy to counterfeit. Typical application areas for holograms are e.g. tamper evidence, brand protection and authentication.

Monitoring of products own security is also important for perishable articles. This is especially important for safety of pharmaceutical products, food, food additives, cosmetics, chemicals or other such products, where the European Union directive requires manufacturers to notify the expiration date of the product usage, i.e. when the useful life of the perishable product lapses, in product packaging. If the perishable product is actually exposed to harmful stimulus being higher/lower than a certain threshold, where the stimulus is caused by physical or chemical phenomenon including mechanical, radiative or other environmental phenomena, the product may degrade or spoil before the calculated expiration date. For example, product's cold chain management needs actual real-time detection of exposure to harmful stimulus through the supply chain to indicate that the product is usable or not.

Surface sensor indicators for food and medical package applications have been on market since 1970-80's. Time and time-temperature indicators are known which operate by chemical reaction mechanism, diffusion mechanism, and capillary driven fluid wicking mechanism, e.g. migration of fluids or gels through wicks to indicate the passage of time or thermal exposure. There are known time and time-temperature indicators that function by flow of a material through channels of the microstructured substrate.

Liquid based time indicators are used for monitoring product safety and quality. Labels to be sticked on products contain a liquid dye which, when activated, migrates across the label at a consistate rate. They are activated by squeezing a start button which moves the liquid into direct contact with a porous membrane through which the liquid diffuses. Labels can be tailored to different time periods. However, liquid based time indicators monitor only time but not product adelturation directly. Time-temperature indicators may operate by chemical reaction, diffusion or capillary driven fluid-wicking mechanism. The label comprising time-temperature indicators reacts to temperature changes and time of exposure of the product to temperatures exceeding a critical temperature. In time-temperature indicators two reagents are diluted and placed in two neighbouring beds where the two solutions are immobilised. Above the critical temperature (freezing the solutions) the structure that immobilises the solutions is damaged and exposure to a given temperature during suitable time (melting the solutions), the solutions are no longer immobilised and they can intermingle causing a reaction which is visible. However, time-temperature indicators react to changes in temperature and time in storage conditions only.

Attempts have also been made to use electronic devices employing a temperature measuring probe and a microcontroller to make it possible both to detect when the temperature is exceeded and for how long. For indicating the result there is also needed a radio frequency transmitter or optical transmitter, e.g RFID or LED device. However, such electronic devices prove to be expensive to be used systematically on all the product items for which it is wished to monitor the temperature. There is also a disadvantage that the electronic circuits such as the sensor probe, microcontroller and transmitter have to be powered by a battery which is expensive and difficult to implement on a disposable product label.

Figure 1:
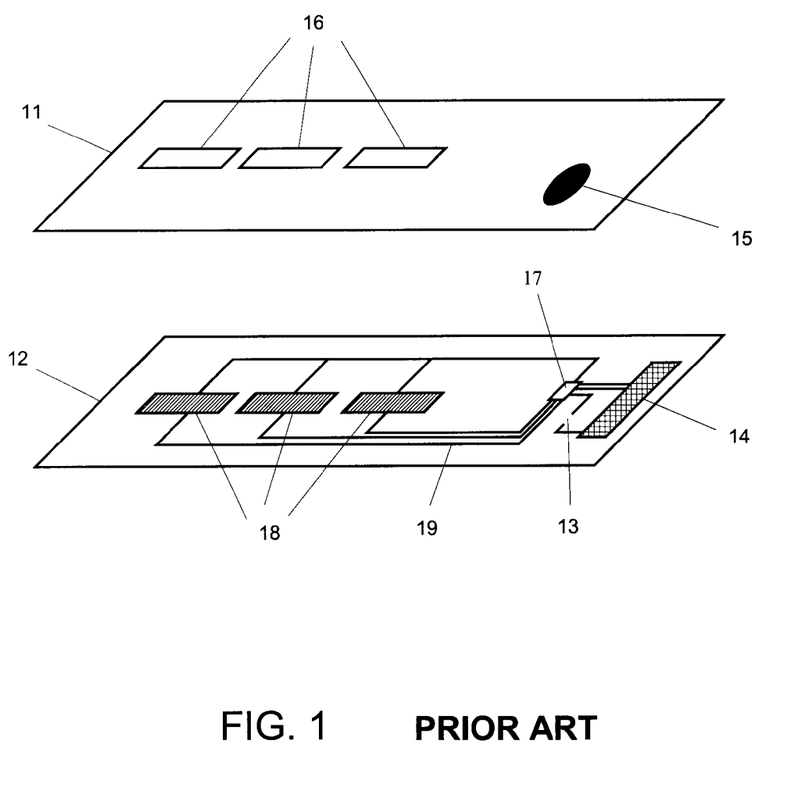
FIG. 1 depicts a perspective drawing of an electronic time indicator according to the prior art.

Referring to FIG. 1 there is depicted an electronic time indicator according to the prior art as disclosed in WO 2008/107871 A1. This electronic indicator can be used as a promotional device providing the user with predetermined information as well as a time dependent product monitoring device. On a substrate layer 12 with displays 18 is a battery 14, a controlling chip 17 and electrical conducting connectors 19. The displays 18 can be e.g. organic light emitting diodes (OLED) that is manufactured e.g. by ink jet printing. The battery 14 can be e.g. a printed paper battery or thin button cell battery. The printed paper battery can be construed using a cathode that is deposited by printing, stamping and sputtering, and an anode that is deposited by printing and stamping, and an electrolyte in a form of a gel and polymer being enclosed in a plastic barrier material to prevent loss of moisture. Electrical conducting connectors 19 pass electrical signals and electrical power from the battery 14 and the controlling chip 17 to the displays 18. Such electrical conducting connectors 19 can be formed onto the substrate layer 12 by ink jet printing, rotary screen printing, etching and other methods known in the art. The controlling chip 17 is positioned directly on to the electrical connectors 19 by dye bonding and flip chip method and it selectively switches power from the battery 14 to the displays 18. A switch 15 is located on a top layer 11 as well as transparent windows 16 for viewing the displays 18. The switch 15 can be a membrane switch, sticky switch, collapsible switch and a removable insulator known in the art. The substrate layer 12 is made of laminatable material such as paper, PVC and PET and the top layer 11 is made of laminatable material such as PP, PVC and PET. The electronic time indicator device is activated by suppressing the switch 15 which closes contacts 13 between the battery 14 and the chip 17 allowing electricity to flow between the battery 14 and the chip 17. Upon activation the counter within the chip 17 begins to count. When the count equals to the pre-registered count constant, then the chip 17 opens an internal electrical gateway allowing electricity to pass from the battery 14 to one of the displays 18 thus causing a visible change in the optical properties of said display 18. Different counts can be pre-registered for each one of the displays 18. However, this kind of electronic indicator has to be manually activated and it only relies on counted time and therefore it does respond to actual exposure to harmful stimulus of physical, chemical or other environmental phenomena.

Further, it requires the battery which is expensive and difficult to implement on a disposable product label.

Therefore, there is a need for an indicator structure that is easily and reliably attachable to monitored products and/or packages. There is also a need for an indicator structure that offers easy and reliable security solution to prevent product counterfeit. Furthermore, there is a need for an indicator structure comprising electronic and/or other circuits that does not require complicated and expensive arrangements to supply power to electronic and/or other circuits requiring energy supply. Furthermore, there is a need for an indicator structure that is easy and cost-effective to manufacture. Furthermore, there is a need for an indicator structure for multifunctional use in tamper evidence, authentication, safety monitoring, promotional, etc. purposes.

SUMMARY OF THE INVENTION

It is an object of the invention to provide reliable and cost-effective detection of an exposure to a stimulus caused by a physical, chemical or other such environmental phenomenon and electronic information revealing indication as a response to the exposure to the phenomenon.

The invention is characterized by what is presented in the independent claims.

In accordance with an aspect of the invention there is provided a microfluidic device comprising
a microchannel filled with at least one substance, and
a conductor providing an intersection area with the microchannel,
wherein as a result of exposure to a physical or chemical phenomenon directed to the microchannel or to the substance in the microchannel the microfluidic device is caused to act so as to control electromagnetic characteristic of the conductor in the intersection area.

According to an embodiment the substance is caused to act between the two conductors in the intersection area.

According to an embodiment the conductor is opened so as to form two conductor ends within the intersection area so that the substance is caused to act between the two conductor ends in the intersection area.

According to an embodiment there is provided an indicator device in which the microfluidic device is connected to means for indicating in order to indicate the exposure to the physical or chemical phenomenon by giving a visual, sound, scent and/or electromagnetic indication.

According to an embodiment the means for indicating is powered by electrical energy generated in the microfluidic device.

In accordance with another aspect of the invention there is provided a method comprising:
providing a microfluidic device comprising a conductor providing an intersection area with a microchannel, said microchannel being filled at least partly with at least one substance, and
detecting a phenomenon exposed to the microchannel or to the substance in the microchannel,
wherein as a result of exposure to the phenomenon directed to the microchannel or to the substance in the microchannel the microfluidic device is caused to act so as to control electromagnetic characteristic of the conductor in the intersection area.

According to an embodiment the method comprises indicating the exposure to the phenomenon by giving a visual, sound, scent and/or electromagnetic indication Further embodiments are disclosed in dependent claims.

The present invention and its advantageous embodiments illustrate a new generic solution to a number of needs that have arisen in connection with limitations of known time indicators, "tamper evidence" indicators, temperature/time indicators and temperature indicators, and promotional devices. A benefit of the embodied invention provides reliable and real-life response to variety of stimuli directed to an object upon exposure to physical, chemical or other environmental phenomenon. A further benefit of the embodied invention provides electrical or electronic response that can be used to effectively indicate a presence of a harmful stimulus. A further benefit of the embodied invention provides to indicate the change of status of indication by optical media such as light, acoustical media such as voice and/or electrical media such as electric field. A further benefit of the embodied invention provides that a detected phenomenon itself can trigger power supply, for example bring a battery electrolyte in contact with electrodes, in order to supply power e.g. to accompanied electronic and/or optical circuits including means for indicating. A further benefit of the embodied invention provides usability in brand promotional purposes. A further benefit of the embodied invention provides low manufacturing costs and therefore suitability for mass-production and applicability to consumer packages.

Various embodiments of the invention together with additional objects and advantages will be best understood from the following description of specific embodiments when read in connection with the accompanying drawings.

BRIEF DESCRIPTION OF THE DRAWINGS

Various further embodiments of the invention will be described in detail below, by way of example only, with reference to the accompanying drawings, of which

FIGS. 3 (a)-(f) depict cross-sectional views of a microchannel intersecting with a conductor in some embodiments of a microfluidic device according to the invention;

FIGS. 6 (a)-(b) depict top views of an embodiment of a microfluidic device according to the invention;

DETAILED DESCRIPTION OF THE INVENTION

The embodiments of the invention presented in this document are not to be interpreted to pose limitations to the applicability of the appended claims. The verb "comprise" or any other variation thereof is used in this document as an open limitation that does not exclude the existence of also unrecited features. The features recited in depending claims are mutually freely combinable unless otherwise explicitly stated. The terms "a", "an" and "at least one", as used herein, are defined as one or more than one. The term "plurality", as used herein, is defined as two or more than two. The terms "including" and "having", as used herein, are defined as comprising. The term "another", as used herein, is defined as at least a second or more. The term "or" is generally employed in its sense including "and/or" unless the content clearly dictates otherwise. For the above-mentioned defined terms, these definitions shall be applied, unless a different definition is given in the claims or elsewhere in this description/specification.

A description of FIG. 1 was given earlier in connection with the description of the state of art.

Figure 2:
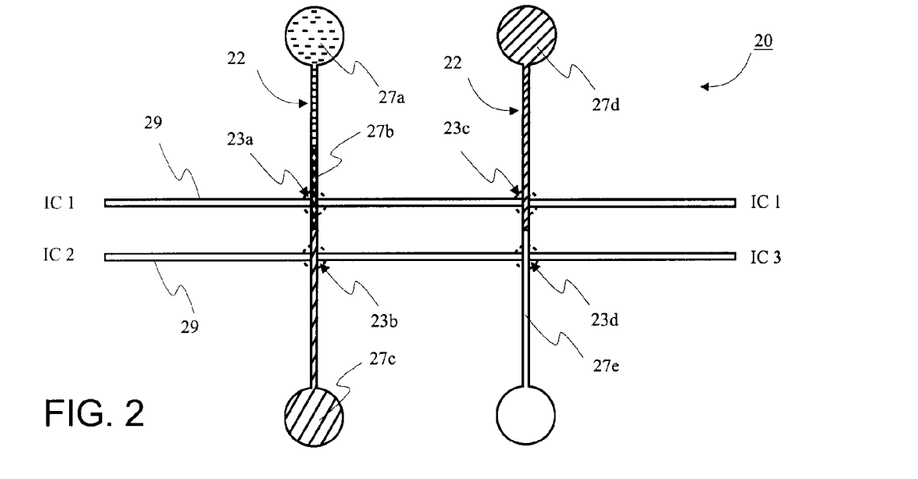
FIG. 2 depicts a top view of an embodiment of a microfluidic device according to the invention.

FIG. 2 shows a microfluidic device 20 comprising at least one microchannel 22 and at least one electric conductor 29, where each of the microchannels 22 intersects with at least one of the electric conductors 29. The verb "intersect" should be understood here to mean crossing each other in any angle with respect to the microchannel 22 or the electric conductor 29 including that they are parallel to each other (zero degree angle). At least one of the electric conductors 29 provides an intersection area 23a-23d with at least one of the microchannels 22 within the intersection area 23a-23d. Electric conductors 29 can, for example, be part of any electronic means (not shown) such as connect internal parts of one electronic component 101 or connect one electronic component 102 to another electronic component 103. Another example is that electric conductors 29 can be part of any electric means (not shown) such as power supply means.

A number of microchannels 22 and electric conductors 29 within the microfluidic device 20 is not limited and it only depends on the pursued functionality. For example, microchannels 22 and electric conductors 29 can also be "sandwiched" above each other so that there is disposed at least one microchannel 22 between each separate conductors 29 multidimensionally. The microchannels 22 and the electric conductors 29 may also be arranged into separate "groups" so that the microchannels 22 and the electric conductors 29 belonging to one group are contiguous to each other. The microchannels 22 and the electric conductors 29 belonging to a first group and a second group may be disposed so that at least the microchannels 22 of the first group and the microchannels 22 of the second group are not contiguous to each other (e.g. the left-hand microchannels 22 belonging to the first group and the right-hand microchannels 22 belonging to the second group in FIG. 2). However, some of the electric conductors 29 and/or the microchannels 22 may belong to several or all groups. In addition to straightlined structures, microchannels 22 and/or electric conductors 29 within the microfluidic device 20 may also branch, bend, wind, be sandwiched or have any other typical structures known for channels and conductors. Two or more intersecting microchannels 22 between two electric conductors 29 is possible, too.

A microchannel 22 is filled at least partly with at least one substance. The micro-channel 22 is configured to receive at least one substance. For example, the microchannel 22, preferably an inner surface of the microchannel 22, may be at least partly coated with a layer of at least one substance. The microchannel 22 may also comprise at least one compartment 27a-27e configured to receive at least one substance. Each of the substances is disposed in separate compartments 27a-27e during the manufacturing process of the microchannel 22 and this disposition of substances corresponds to an initial disposition and form of substances (initial state). In its initial disposition (initial state) the substance can be any solid, gelatinous or fluid material having particular qualities. Fluid is understood here to be any liquid or gas or any flowable substance including air and moisture. The substance in its initial state may comprise different materials or components being mixed together.

In some embodiments the microchannel material itself or material forming at least part of the microchannel is a substance in the sense the word "substance" is used throughout this application. For example, the microchannel 22 itself is made of certain material (first substance) and it is filled with air (second substance). Another example is that a compartment wall of the microchannel 22 is made of polymer (first substance) and the compartment 27a-27e is filled with air (second substance). Another example is that a wall between a first and second compartments 27a, 27b of the microchannel 22 configured to separate two substances from each other is made of certain material (first substance), the first compartment 27a is filled with air (second substance) and the second compartment 27b is filled with certain fluid (third substance).

According to an example the substance alone is capable of reacting, if certain condition(s) are met, so that a final substance has changed its state (changed state) with respect to its initial state. According to an example the substance is capable of reacting with another substance, if certain condition(s) are met, so that a final substance has changed its state (changed state) with respect to initial state of one or both of the substances. According to an example the microchannel 22 itself can be made of material, as earlier described, that is capable of reacting with the substance in the microchannel 22, if certain condition(s) are met. According to an example the microchannel 22 may also be made of material that is capable of reacting with the substance in another microchannel 22 being contiguous to the above-mentioned microchannel 22, if certain condition(s) are met. In the last case the microchannels 22 are preferably touching each other within the intersection area 23a-23d. The reaction (or action) due to influence on the substance alone or due to interaction between the substances is a consequence of any physical or chemical or other such reaction that occurs in at least one of the substances. Examples of these reactions (actions) are explained later in more detail. In its final disposition (changed state) the substance can be any solid, gelatinous or fluid material having particular qualities. The substance can also be porous material that can bind, absorb, filter, convey or transmit at least partly one or more other substances.

The microfluidic device 20 may be exposed to a physical or chemical or other environmental phenomenon that is directed to the microchannel 22 or to the substance in the microchannel 22. When the exposure to the phenomenon meets certain condition(s) defined by certain threshold value(s), the substance may change its form or state from the initial state (before exposure) to the changed state (upon i.e. after exposure). How the change of form or state of the substance can be detected and indicated will be explained later. The threshold value(s) for the substance can be based on certain preset limit value(s) with respect to the exposure of the phenomenon, i.e. whether an actual stimulus caused by the phenomenon with respect to preset limit value(s) is higher, lower or equal to or is between preset limit value(s). Alternatively, the threshold value(s) for the substance can be based on natural characteristics of the substance with respect to the exposure of the phenomenon and there is not necessarily needed any preset determination of the limit value(s). The threshold value(s) for the substance can also be based on its artificial, programmed or other such behaviour and/or characteristics. In the sense of this application, physical and/or chemical phenomena may include e.g. time, temperature, pressure, shock, mechanical impact, tilt, radiation, electrical phenomenon, optical phenomenon, leakage, fluid dispensing or other such environmental or external phenomenon. Physical and/or chemical phenomenon may also include any combinations of those phenomena.

The physical or chemical phenomenon being exposed to the microchannel 22 or to the substance in the microchannel 22 cause the substance to act when certain threshold value(s)

with respect to the exposure has been met. However, it is not necessary to define any limit value(s) in which case exposuring cause action all the time when being present. In consequence of the action the substance goes through a state or form change that is typical for this particular substance when exposed to certain phenomenon within certain limit(s) or all the time during the exposure. Such state or form change upon exposure may be that the substance deforms from solid to fluid, solid to gel, gel to fluid, or vice versa. Here fluid is any liquid, gas or other such flowable substance; for example air, moisture, alcohols and organic solvents are fluids in this application. Such state or form change can be also, just to name few examples, swelling or shrinking of the substance, absorption of the substance by another substance (including going through, seeping through, soaking through, getting wet, etc.), change in viscosity, intermingling with another substance, decomposition of substances, degradation or breakdown of the substance (e.g. gas flowing off from the microchannel), etc.

The state or form change of the substance due to any physical or chemical phenomenon being exposed to the microchannel 22 or to the substance in the micro-channel 22 then results certain reactions to happen in the microfluidic device 20. In the following few examples of these reactions are given but reactions are not limited to these examples. These reactions include movement of the substance along the microchannel 22, e.g. the substance flows capillary along the micro-channel 22, or the substance flows capillary through the any part of the micro-channel 22a, 22b or a wall between compartments 27a-27e of the microchannel 22. Among other, these reactions also include movement by pressure difference, hydrofobicity, hydrophilicity, liquid dispensing, breakage, electromagnetic field, electric potential, optical stimulus, temperature, time, swelling, shrinking, leakage, etc. These reactions also include the state or form change of the substance in the microchannel 22 so that the substance does not need to move along the micro-channel 22. The substance may therefore change its state or form in its initial disposition upon exposure. As is known to the skilled person the substance's behaviour with respect to the exposure also depends on characteristics of the micro-channel 22, e.g. dimensions, structures and materials of the microchannel 22. For example, if two intersecting microchannels 22 have different depths there can be used certain structures to bridge the intersection as known in the art.

As exemplary shown in FIG. 2 the microchannel 22 on the left comprises three compartments 27a-27c for substances where first, second and third compartments are filled with first, second and third substance, respectively. In its initial disposition the second substance in the second compartment 27b is disposed in a first intersection area 23a and the third substance in the third compartment 27c is disposed in a second intersection area 23b. In its initial position the first substance in the first compartment 27a is not disposed within any intersection area 23a-23d. Due to the physical or chemical phenomenon directed to any part of the microchannel 22 or to any one of the first, second or third substances in the compartments 27a-27c of the microchannel 22 the microfluidic device 20 acts in a certain way which is typical to the substance under exposure and characteristics of the microchannel 22, e.g. dimensions, structures and materials of the compartments 27a-27c and the microchannel 22. For example, if the first substance of the first compartment 27a is exposed to the phenomenon, then upon exposure the first substance changes its state and in its changed state the first substance forces the second substance of the second compartment 27b to move, e.g. flow capillary, to the third compartment 27c, where the second substance e.g. intermingles with the third substance. In consequence of the action the substance now disposing in the first intersection area 23a as well as the substance now disposing in the second intersection area 23b have different physical and/or chemical properties than the second and third substances in the initial disposition, respectively. While not shown in FIG. 2 the microchannel 22 may be also filled with more than three substances where each substance is disposed in a different compartment 27a-27e of the microchannel 22.

According to another example shown in FIG. 2 the microchannel 22 on the rightside comprises two compartments 27d-27e for substances where first and second compartments are filled with first and second substance, respectively. In its initial disposition the first substance in the first compartment 27d is disposed in a first intersection area 23c and the second substance in the second compartment 27e is disposed in a second intersection area 23d. Due to the physical or chemical phenomenon directed to any part of the microchannel 22 or to the first or second substances in the compartments 27d-27e of the microchannel 22 the microfluidic device 20 acts in a certain way. For example, if the first substance of the first compartment 27d is exposed to the phenomenon, then upon exposure the first substance changes its state and in its changed state the first substance forces the second substance of the second compartment 27e to move, e.g. flow capillary, to the first compartment 27d. In consequence of the action the substance now disposing in the first intersection area 23c as well as the substance now disposing in the second intersection area 23d have different physical and/or chemical properties than the first and second substances in their initial disposition, respectively.

While not shown in FIG. 2 the microchannel 22 can also be fully filled with only one substance in which case the microchannel 22 itself also forms the compartment 27a-27e. Upon exposure to the physical or chemical phenomenon the substance changes its state so that its physical and/or chemical properties changes. It is also possible that upon exposure to the phenomenon the substance changes its state so that the original substance in its initial state is at least partly replaced by another substance. For example, upon exposure a liquid (initial state) runs out of the microchannel 22 and air (changed state) replaces it, or compressed air (initial state) runs out of the microchannel 22 and fresh air (changed state) replaces it.

Figure 3:
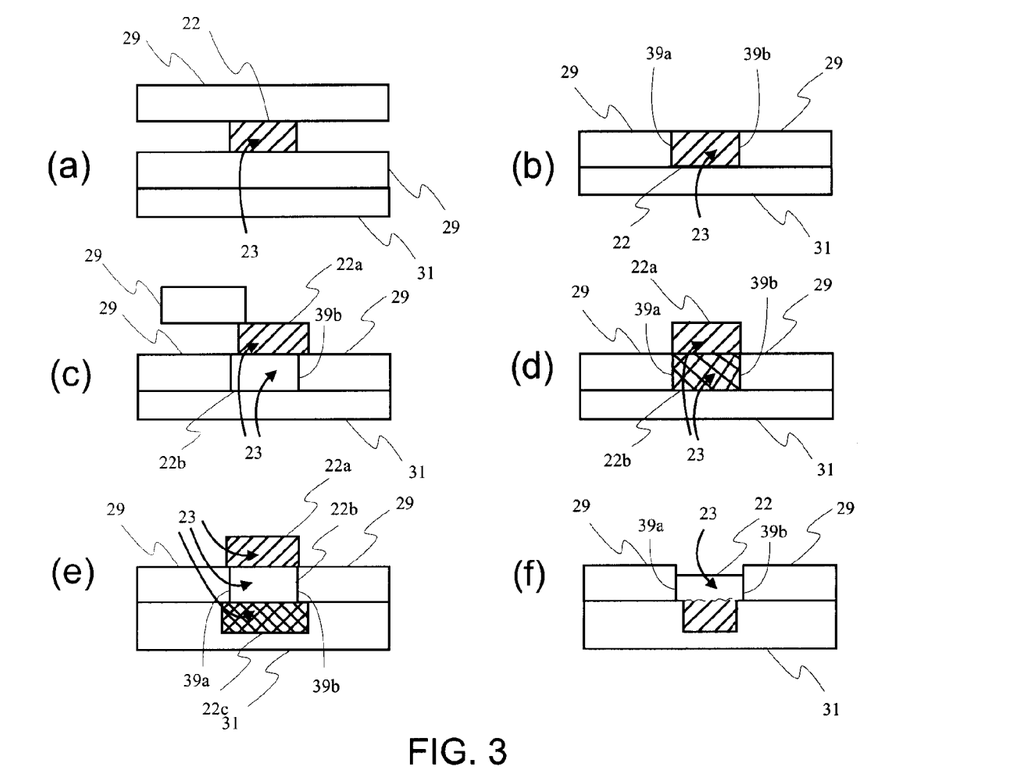

In the intersection area 23 the microchannel 22, which is filled at least partly with at least one substance, is fitted to at least partly touch at least one conductor 29, as shown in FIGS. 2 and 3 (a)-(f), before exposure to the physical or chemical phenomenon. The substance in the microchannel 22 may also at least partly touch the conductor 29, for example, when the abutment of the microchannel 22 and the conductor 29 is implemented in a way that allows the substance to be coupled to the conductor 29. For example, in the beginning the abutment of the microchannel 22 and the conductor 29 allows that the space between two conductors 29 or two conductor ends 39a, 39b is filled with the substance in the microchannel 22 and that the microchannel 22 itself is also fitted to touch the two conductors 29 or two conductor ends 39a, 39b. In accordance to above, before exposure to the physical or chemical phenomenon the microchannel 22 or the microchannel 22 and the substance in its initial state in the microchannel 22 is fitted to intersect at least one conductor 29, either in the same plane or contiguous to each other, so that the microchannel 22 or the microchannel 22 and the substance in the microchannel 22 touch at least partly the conductor 29 in the intersection area 23. Upon exposure to the physical or chemical phenomenon the substance in its changed state is fitted to touch at least one conductor 29 in the intersection area 23. This also applies to the microchannel 22 as a substance in its changed state as earlier described in this application.

FIGS. 3 (*a*)-(*f*) depict cross-sectional views of exemplary structures how at least one conductor 29 provides an intersection area 23 with at least one microchannel according to some embodiments of the microfluidic device 20. In the microfluidic device 20 conductors 29 and microchannels 22 are manufactured on a substrate 31, e.g. using printing process. In FIG. 3 (*a*) the microchannel 22, which is filled with the substance, is fitted to touch two conductors 29. In this case before exposure the intersection area 23 abuts on common interfaces of the conductors 29 and the microchannel 22 or common interfaces of the conductors 29 and the substance in the microchannel 22, and upon exposure on common interfaces of the conductors 29 and the substance (also in case the microchannel 22 as a substance). In FIG. 3 (*b*) the microchannel 22, which is filled with the substance, is fitted to touch two conductors ends 39*a*, 39*b* of the conductor 29. In this case before exposure the intersection area 23 abuts on common interfaces of the conductors ends 39*a*, 39*b* and the microchannel 22 or common interfaces of the conductors ends 39*a*, 39*b* and the substance in the microchannel 22, and upon exposure on common interfaces of the conductor ends 39*a*, 39*b* and the substance (also in case the micro-channel 22 as a substance). In FIG. 3 (*c*) the microchannel 22*a*, which is filled with the substance, is fitted to touch one of two conductor ends 39*b* of the conductor 29 and another conductor 29 being contiguous to the microchannel 22*a*. In this case before exposure the intersection area 23 abuts on common interfaces of the one of the conductor ends 39*b* and another conductor 29 and the microchannel 22*a* or common interfaces of the one of the conductor ends 39*b* and another conductor 29 and the substance in the microchannel 22*a*, and upon exposure on common interfaces of one of the conductor ends 39*b* and another conductor 29 and the substance (also in case the microchannel 22*a* as a substance). However, in FIG. 3 (*c*) also examples of FIG. 3 (*a*) or FIG. 3 (*b*) are applicable alone or together so that the intersection area 23 is abutted on the microchannel 22*b* or the combination of the contiguous microchannels 22*a*, 22*b*. In the latter case the substances in the contiguous microchannels 22*a*, 22*b* are, for example, mixed or intermingled upon exposure. For example, if conductive substance in the microchannel 22*a* and non-conductive substance in the microchannel 22*b*, then the conductor end 39*b* and another conductor 29 are electrically connected. Or, for another example, if the substances in both the microchannels 22*a*, 22*b* are conductive, then the two conductor ends 39*a*, 39*b* and another conductor 29 are electrically connected to each other. In FIG. 3 (*d*) two contiguous microchannels 22*a*, 22*b*, which are filled with separate substances, are fitted to touch two conductors ends 39*a*, 39*b* of the conductor 29. In this case before exposure there are three different possibilities: the intersection area 23 abuts on (i) common interfaces of the conductors ends 39*a*, 39*b* and the microchannel 22*a* (or the substance in the microchannel 22*a*), or (ii) common interfaces of the conductors ends 39*a*, 39*b* and the microchannel 22*b* (or the substance in the microchannel 22*b*), or (iii) common interfaces of the conductors ends 39*a*, 39*b* and the combination of the contiguous microchannels 22*a*, 22*b*. Upon exposure the intersection area 23 abuts on common interfaces of the conductor ends 39*a*, 39*b* and the substance according to possibilities (i)-(iii) (also in case the microchannel 22*a*, 22*b* as a substance). In FIG. 3 (*e*) three contiguous microchannels 22*a*, 22*b*, which are filled with separate substances, are fitted to touch two conductors ends 39*a*, 39*b* of the conductor 29, where the microchannel 22*c* is embedded into the substrate 31. In this case before exposure there are six different possibilities: the intersection area 23 abuts on (i)-(iii) as above, or (iv) common interfaces of the conductors ends 39*a*, 39*b* and the microchannel 22*c* being embedded into the substrate 31 (or the substance in the microchannel 22*c*), or (v) common interfaces of the two conductors ends 39*a*, 39*b* and the combination of the microchannels 22*a*, 22*c* being contiguous to the conductor 29 having two conductors ends 39*a*, 39*b*, or (vi) common interfaces of the conductors ends 39*a*, 39*b* and the combination of the three contiguous microchannels 22*a*, 22*b*, 22*c*.

Upon exposure the intersection area 23 abuts on common interfaces of the conductor ends 39*a*, 39*b* and the substance according to possibilities (i)-(vi) (also in case any of the microchannel 22*a*, 22*b*, 22*c* as a substance). In FIG. 3 (*f*) the microchannel 22 is partly embedded into the substrate 31 and the embedded part of the microchannel 22 is filled with a first substance and other part of the micro-channel 22 with a second substance before exposure. The microchannel 22 is fitted to touch two conductors ends 39*a*, 39*b* of the conductor 29. Upon exposure the first substance for example expands or swells in such a way that it fills at least some part of the space between the conductors ends 39*a*, 39*b* (not shown). In this case the intersection area 23 abuts on common interfaces of the conductor ends 39*a*, 39*b* and the first substance in its changed state or on common interfaces of the conductor ends 39*a*, 39*b* and the combination of the first and second substance.

As a result of exposure to a physical or chemical phenomenon directed to the microchannel 22 or to the substance in the microchannel the microfluidic device 20 is arranged to control electromagnetic characteristic of the electric conductor 29 in the intersection area 23*a*-23*d*, as shown in FIG. 2. The term "electromagnetic characteristic" is defined to include electricity, magnetism and optical radiation and their mutual dependences. It also includes all forms of chemical phenomena, which arise from interactions between electron orbitals. For example, when the substance is in its changed state, its ability to transmit an electric field, i.e. permittivity, is typically different compared to the substance in its initial state. Permittivity relates to dielectricity and dielectric polarization of the substance in response to the field, e.g. capacitance. The capacitor is typically made of dielectric material with high permittivity. Another example is that the substance in its changed state may respond to magnetic field differently than the substance in its initial state, i.e. its permeability is changed. Another example is when the substance is in its changed state its ability to conduct electric current, i.e. conductivity and resistivity, is changed compared to the substance in its initial state. Electrical conductivity, permittivity and permeability of the substance also depend on the frequency and strength of the electric or magnetic field applied to the substance. Electrical conductivity, permittivity and permeability of the substance are also dependent on ambient parameters such as temperature and humidity.

In the microfluidic device 20 the substance is caused to act so as control electromagnetic characteristic of the electric conductor 29. Alternatively, the microchannel 22 or the microchannel 22 and the substance are caused to act so as control electromagnetic characteristic of the electric conductor 29. In this case the micro-channel 22 is made of material that is capable of reacting itself or with another substance when certain condition(s) are met. Upon exposure the substance in its changed state has different conductive, resistive or dielectric properties than in its initial state so that conductivity of the conductor changes when the substance is in contact with the conductor 29.

According to an embodiment of the microfluidic device 20 two conductors 29 provide the intersection area 23a-23d with the micro-channel 22 so that the micro-channel 22 is between the conductors 29 in its initial state. When upon exposure the substance is arranged to act between two conductors 29 in the intersection area 23a-23d and the substance fills a space between the two conductors, there is introduced to occur certain electromagnetic phenomenon between the two conductors that depends on the properties of the substance in question. This electromagnetic phenomenon controls conductivity of the two conductors in the intersection area 23a-23d, where the two conductors 29 and the substance between them form for example part of an electric circuit.

According to an embodiment of the microfluidic device 20 the conductor 29 may also provide the intersection area 23a-23d with the microchannel 22 so that the conductor 29 is opened so as to form two conductor ends 39a, 39b within the intersection area 23a-23d so that the microchannel 22 intersect the two conductor ends 39a, 39b of the conductor 29 in the same plane with respect to each other. The conductor is opened, when there is a space (pitch) between the conductor ends 39a, 39b within the intersection area 23a-23d and the electric conductor 29 does not conduct when insulating substance, e.g. air, attends in the space. Then upon exposure the substance is arranged to act between the two conductor ends 39a, 39b and the substance fills a space between the two conductor ends 39a, 39b within the intersection area 23a-23d in order to introduce to occur certain electromagnetic phenomenon between the two conductor ends 39a, 39b. This electromagnetic phenomenon controls conductivity of the two conductor ends 39a, 39b of the conductor 22 in the intersection area 23a-23d, where the two conductor ends 39a, 39b and the substance between them form for example part of an electric circuit.

Further electromagnetic phenomenon between the two conductors 29 or the two conductor ends 39a, 39b (conductivity of the connection) can be controlled by properties of conductivity, dielectricity, permittivity and/or permeability of the substance. Then upon exposure resistive, capacitive, inductive or magnetic connection may be provided between the two conductors 29 or the two conductor ends 39a, 39b that form for example part of an electric circuit.

In an embodiment of the microfluidic device 20 the action due to exposure is detected as a change in electric and dielectric properties of the substance in the intersection area 23a-23d between the two conductors 29 or the conductor ends 39a, 39b of the conductor 29 and therefore conductivity of the conductors 29 can be controlled. Upon exposure to the physical or chemical phenomenon the substance in the intersection area 23a-23d changes its state so that in its changed state the substance in the intersection area 23a-23d has different electric and dielectric properties than the substance in its initial state. For example, in its initial state the substance in the intersection area 23a-23d may be a good insulator and in its changed state the substance in the intersection area 23a-23d may be an excellent conductor or both can be anything between the good insulator and excellent conductor. The substance in its initial state and the substance in its changed state do not necessarily depend on each other at all, because the first one can be made of totally different material than the second one and/or it can be in totally different state (solid, fluid, gel) than the second one. However, the substance in its initial state and the substance in its changed state can be made of same material and/or be in same state and the substance in its changed state may include the substance in its initial state. For example, the substance in its initial state and the substance in its changed state may be intermingled or mixed with each other, or the substance in its changed state only changes its state (between solid, fluid, gel) from the state of the substance in its initial state, or the substance in its changed state only changes its shape or size (e.g. swelling or shrinking) from the shape or size of the substance in its initial state.

In an embodiment of the microfluidic device 20, upon exposure the substance electrically connects or disconnects the conductor 29 in the intersection area 23a-23d. When upon exposure the substance between the two conductors 29 or between the two conductor ends 39a, 39b is a pure insulator that fills the space between the two conductors 29 or the two conductor ends 39a, 39b of the conductor 29, there is no electric connection between the two conductors 29 or the two conductor ends 39a, 39b of the conductor 29. When upon exposure the substance between the two conductors 29 or between the two conductor ends 39a, 39b is conductive material that fills the space, there is electric connection between the two conductors 29 or the two conductor ends 39a, 39b of the conductor 29. In the latter case, electric connection between the two conductors 29 or the two conductor ends 39a, 39b (conductivity of the connection) can be controlled by properties of conductivity and/or dielectricity of the substance. Thus, the microfluidic device 20 allows operation as a microfluidic switching device.

In an embodiment of the microfluidic device 20, upon exposure the substance is caused to form an electrolyte being coupled to the conductor 29 when the substance is in contact with the conductor 29. In its changed state the substance is suitable for electrolysis if it contains mobile ions. When upon exposure the substance, between the two conductors 29 or between the two conductor ends 39a, 39b, is the electrolyte that fills the space between the two conductors 29 or between the two conductor ends 39a, 39b, an electrolysis, i.e. the passage of an electric current through an ionic substance, is achieved between two electrodes formed by the two conductors 29 or the two conductor ends 39a, 39b of the conductor 29. When using the substance that is in its changed state made of suitable material to act as the electrolyte, the two conductors 29 and the substance between them or the two conductor ends 39a, 39b and the substance between them are able to provide electrical energy. For example, this electrical energy can result from battery operation or fuel cell operation when the substance is suitable for operating as an electrolyte. Thus, as a result of exposure to the physical or chemical phenomenon the microfluidic device 20 is caused to trigger a power supply operation, for example, by bringing a battery electrolyte in contact with electrodes, i.e. the two conductors 29 or the two conductor ends 39a, 39b of the conductor 29. The electrical energy can be conducted through the two conductors 29 or the conductor 29 having two conductor ends 39a, 39b to an electric circuit. The two conductors 29 and the substance between them or the two conductor ends 39a, 39b and the substance between them may form for example part of an electric circuit or they may be connected the electric circuit.

Figure 4:
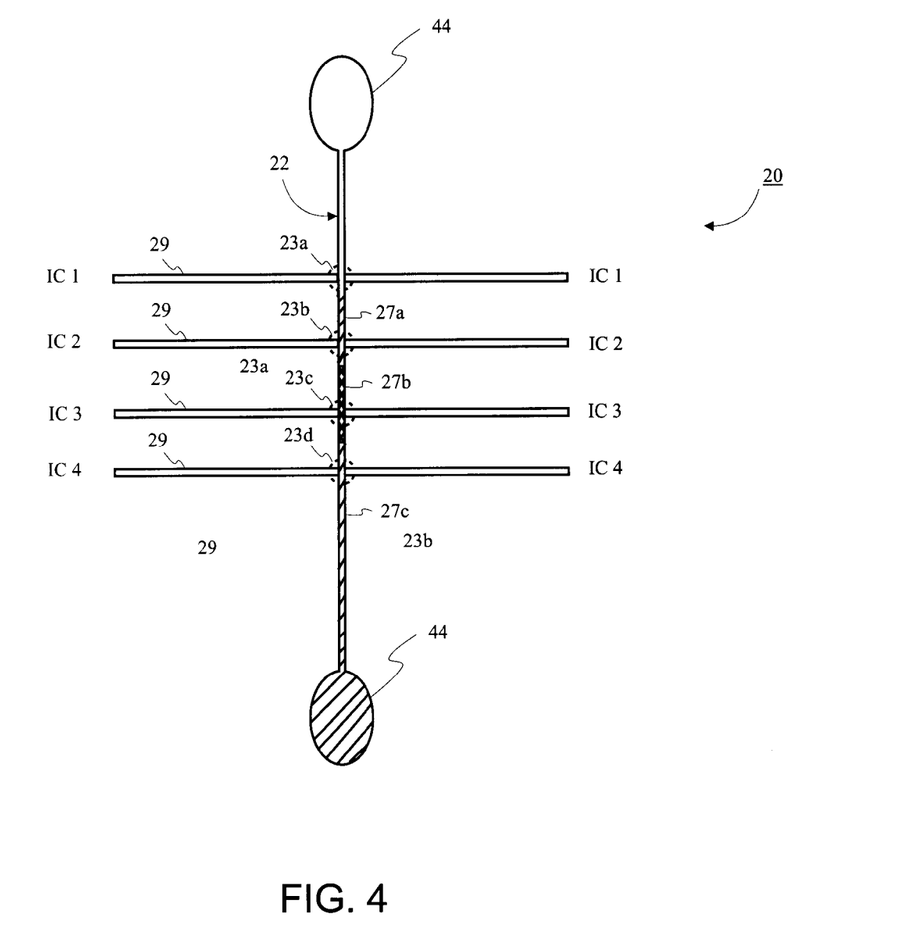
FIG. 4 depicts a top view of an embodiment of a microfluidic device according to the invention.

In an embodiment of the microfluidic device 20 the microchannel 22, which is filled with two different substances, a plurality of electric connectors 29 are intersecting the microchannel 22 so that the microchannel 22 and the plurality of electric connectors 29 provide a plurality of intersection areas 23a-23d. FIG. 4 shows as an example a microfluidic device 20 that can be called a phenomenon sensitive bi-fluidic switching device. Each of the connectors 29 is electrically connected to an electric or electronic circuit IC1-IC4 so that a plurality of circuits IC1-IC4 are connected to the plurality of the connectors 29 in the microfluidic device 20. Each of the two substances in the microchannel 22, or the microchannel 22 itself, senses a particular physical or chemical phenomenon, such as time, temperature, pressure, shock, mechanical impact, tilt, radiation, electrical phenomenon, optical phenomenon, leakage, fluid dispensing or other such environmental or external phenomenon. For example, the substance in the microchannel 22, the microchannel 22 itself or both can be made of heat-sensitive polymer, electric field-sensitive polymer or a number of different smart polymers. Also several options and combinations are possible. Before exposure, for example, one of the substances is conductive substance and the other one is non-conductive substance and the microchannel 22 may be filled so that the conductive substance is in the compartment 27b between two other compartments 27a, 27c filled with non-conductive substance, etc. Upon exposure the plurality of electric or electronic circuits IC1-IC4 are switched on or off depending on the movement of the non-conductive and conductive substances in the intersection areas 23a-23d along the microchannel 22 due to the phenomenon sensed by the two substances in the microchannel 22 or the micro-channel 22 itself. Containers 44 are provided at the ends of the microchannel 22 to store or receive the substance. Due to different phenomena different electric or electronic circuits IC1-IC4 are either connected or not connected which causes changes in electrical operation of the circuits IC1-IC4 or changes in content of the circuits IC1-IC4 (e.g. memory chips, counters, processors, etc.).

In an embodiment of the microfluidic device 20 the action due to exposure to the physical or chemical phenomenon is detected as an electronic or electric phenomenon that is controlled by electromagnetic characteristic of the electric conductors 29. Indication outwards can be provided using the detected electronic or electric phenomenon to control the connection to means for indicating 40 that is electrically connected to the microfluidic device 20.

For example, in the microfluidic device of FIG. 4 indication can be provided by connecting the means for indicating 40 to the microfluidic device 20. In this example, upon exposure, indication outwards is based on changes in electrical operations and/or contents of the different electric or electronic circuits IC1-IC4 that are detected and then indicated by the means for indicating 40.

Figure 5:
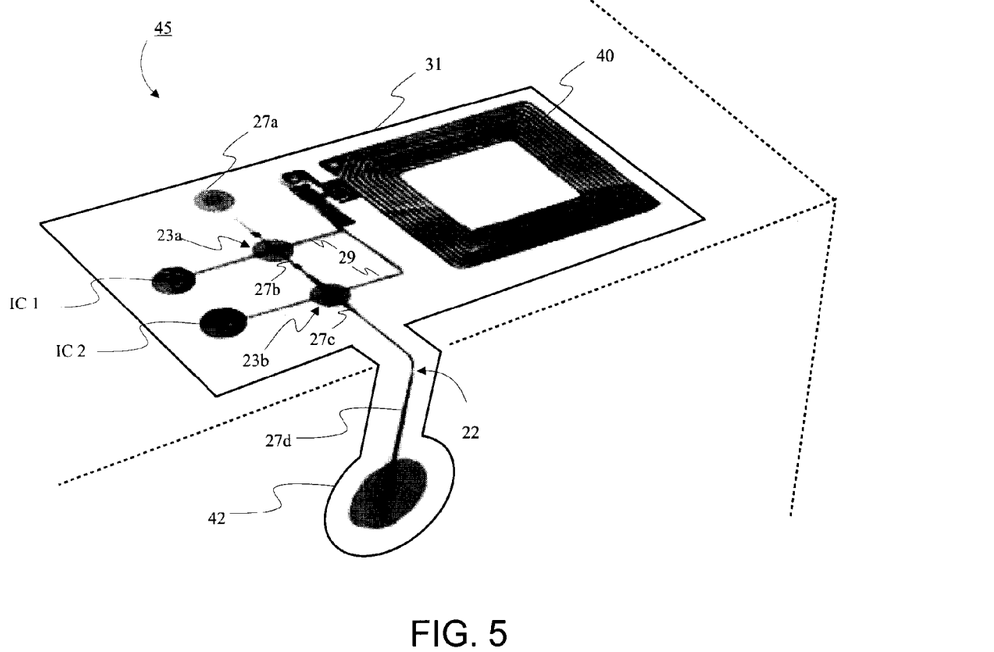
FIG. 5 depicts a top view of an embodiment of an indicator device according to the invention.

FIG. 5 depicts an example of an indicator device 45 that is assembled, e.g. printed, on the substrate 31. The indicator device 45 comprises the microfluidic device 20 according to an embodiment, as earlier described, being electrically connectable to the means for indicating 40 in order to indicate the exposure to the physical or chemical phenomenon outwards. The means for indicating 40 is arranged to give a visual, sound, scent and/or electromagnetic indication upon exposure. The indicator device 45 may further comprise other electric means such as electric or electronic circuits 101, 102.

Figure 6:
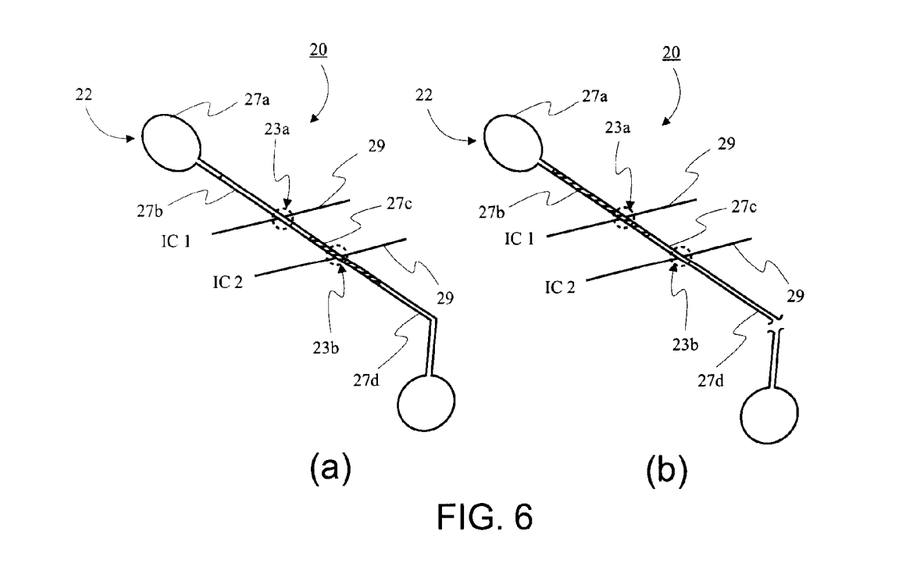

FIG. 5 depicts an example of an indicator device 45 which can be used as a seal in order to prevent tampering. The microchannel 22 and intersecting conductors 29 may be printed on the substrate 31, such as label material being attachable to an object e.g. a packet or DVD box. The projection portion 42 of the substrate 31 comprises part of the microchannel 22 and the projection portion 42 overhangs the sealed section of the object to be protected. Further, the indicating device 45 comprises an RF antenna 40, preferably an RFID antenna, being electrically connected to the conductors 29 in the microfluidic device 20. Electronic circuits IC1, IC2, e.g. memory chips, are also connected to the conductors 29 of the microfluidic device 20 so that the microfluidic device 20 according to an embodiment can be used to control electromagnetic characteristic of the conductor 29 between the electronic circuits 101, 102 and the RF antenna 40. Two intersection areas 23a, 23b are formed in this example. Before exposure the microchannel 22 comprises at least non-conductive substance in the compartment 27b in the intersection area 23a and conductice substance in the compartment 27c in the intersection area 23b, and said substances are maintained by means of an airlock at the end portions 27a, 27d of the microchannel 22. Therefore, in the beginning the chip 102 is connected to the RFID antenna 40 and the chip 102 is not connected to the RFID antenna 40 as shown in FIG. 6 (a) and therefore the RFID antenna has content defined by the chip 102 (before exposure). RFID device (tag) includes the RFID antenna and the microchip having memory for storing the ID code. Upon exposure, e.g. by breaking the projection part 42, the airlock at the end portion 27d in the projection part 42 is opened and due to pressure difference the conductive substance is moved along the microchannel 22 e.g. from the compartment 27c to the compartment 27b, so that the conductive substance is disposed in the intersection area 23a, as shown in FIG. 6 (b). In the same time the non-conductive substance in the compartment 27b moves from the intersection area 23a towards the end portion 27a, and the compartment 27c is filled with atmospheric air so that the microchannel 22 is "empty" in the intersection area 23b. The atmospheric air is a non-conductive substance. The microfluidic device 20 acts here as a switching device that switches off the RFID antenna 40 being electrically connected to the chip 102 and switches on the RFID antenna 40 being electrically connected to the chip 101 (upon exposure). Therefore, content of the RFID antenna 40, e.g. antenna characteristics, has been changed and the new content is indicated outwards as a result of the exposure to the physical or chemical phenomenon directed to the microchannel 22 or the substance in the microchannel 22 of the microfluidic device 20. According to this example the indicator device 45 gives an indication based on electromagnetic radio frequency signal and this signal can be detected for example by a RFID reader device or any mobile terminal device having RFID receiver. In addition to the radio frequency identification (RFID), for example near field communication (NFC) identification which is based on RFID, can be applied for indication, respectively.

According to another example in an indicator device 45 the means for indicating 40 may comprise an organic light emitting diode (OLED) whose emissive electroluminescent layer is composed of a film or organic compounds. The OLED can be deposited by printing process onto a flat carrier that forms the substrate 31. Content of the OLED can be controlled by the microfluidic device 20 in the same principle as discussed in connection with the RFID antenna. According to this example the indicator device 45 gives a visual indication which can be also detected visually.

According to another example in an indicator device 45 the means for indicating 40 may comprise a loudspeaker or a buzzer and output content of the loudspeaker or the buzzer can be controlled by the microfluidic device 20 in the same principle as discussed in connection with the RFID antenna. According to this example the indicator device 45 gives a sound indication which can be detected sensory.

According to another example in an indicator device 45 the means for indicating 40 may comprise a scent means arranged to output scent, where the scent means is controlled by the microfluidic device 20 in the same principle as discussed above in order to change scent content of the scent means. According to this example the indicator device 45 gives a scent indication which can be detected sensory.

The indicator device 45 comprising any combination of above-mentioned means for indicating 40 is possible.

In an embodiment of the indicator device 45 the means for indicating 40, e.g. OLED or RFID antenna/tag, can be powered by the microfluidc device 20. Also one or more of the electric or electronic circuits IC1-IC4 that are connected to the microfluidic device 20 can be powered by the microfluidc device 20. As earlier explained the microfluidic device 20 can trigger a power supply operation, for example, by bringing a battery electrolyte (the substance in its changed state) in contact with the two conductors 29 or the two conductor ends 39$a$, 39$b$ of the conductor 29 (electrodes). Therefore, the means for indicating 40 receives its supply voltage from the microfluidic device because of an electrolytic effect between the two conductors 29 or between the two conductor ends 39$a$, 39$b$ forming electrodes (e.g. battery electrolyte, fuel cell electrolyte). The generated supply voltage can be conducted through the two conductors 29 or the conductor 29 having two conductor ends 39$a$, 39$b$ to the electric or electronic circuit IC1-IC4, preferably to the means for indicating 40. The indicator device 45 according to this embodiment does not need any other power supply.

In an embodiment of the indicator device 45 comprising a power source such as a battery, the means for indicating 40 and other electric or electronic circuit IC1-IC4 as well, may receive their supply voltage from the power source. The power source may be one of the electric circuits IC1-IC4 implemented in the indicator device 45. When the conductive substance fills the space between the two conductors 29 or between the two conductor ends 39$a$, 39$b$ so that supply voltage can be transferred along conductor wires. However, in this case the microfluidic device 20 can control power consumption in the indicator device 45 by switching on and off the power source according to the action caused by the exposure to the phenomenon according to the invention.

The embodied invention may also be used as a brand promotion device, when the means for indicating 40 is designed to give indication in a specified way. For example, the means for indicating 40 can be implemented as a logo-shaped OLED, a loudspeaker outputting certain jingle, scent means spreading certain odour, etc. or any combination of aforementioned.

Figure 7:
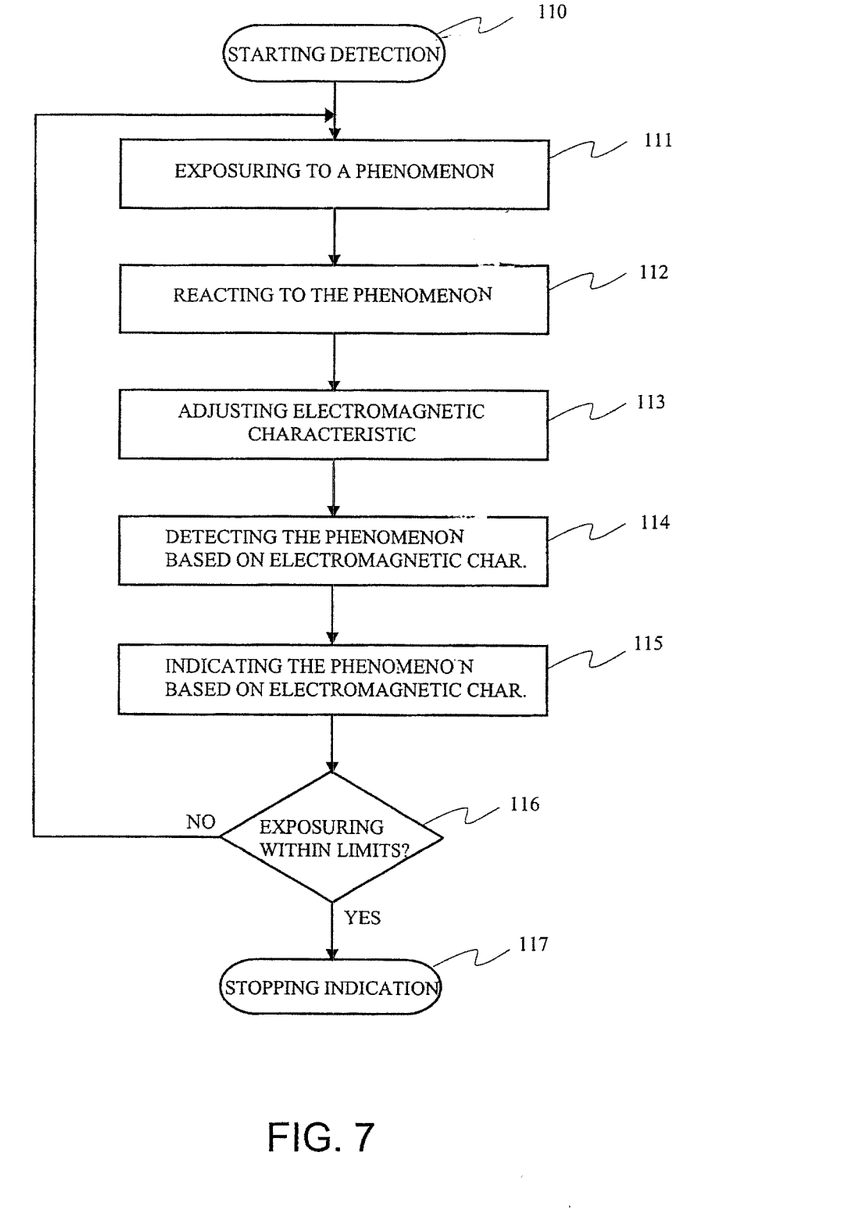
FIG. 7 depicts a flow diagram of an embodiment of a method according to the invention.

FIG. 7 shows a flow chart of a method according to an embodiment for providing detection of an exposure to a physical or chemical phenomenon and revealing information as a response to the exposure. In step 110 detection of the physical or chemical phenomenon is started. Therefore, there is provided a microfluidic device comprising a conductor that provides an intersection area with a microchannel, wherein said microchannel is filled at least partly with at least one substance. In step 111 the substance, which may be the substance in the microchannel or the microchannel as a substance, is exposed to the physical or chemical phenomenon and in step 112 the substance is reacting to the exposure according its natural, artificial, programmed or other such behaviour and/or characteristics. Due to reaction to the exposure to the physical or chemical phenomenon the substance changes its state and its interaction with the conductor cause certain electromagnetic effects in the intersection area. Therefore the microfluidic device is caused to act so that electromagnetic characteristic of the conductor in the intersection area is controlled according to the exposure of the substance. Thus electromagnetic characteristic is adjusted by the physical or chemical phenomenon according to step 113. Then in step 114 the physical or chemical phenomenon is detected based on the electromagnetic characteristic and in step 115 indicated based on the electromagnetic characteristic. There may be predetermined certain limit value(s) for the exposure to the physical or chemical phenomenon so that the exposure is ignored when its intensity is within said limit value(s). In step 116 the process continues to step 111 if said limit value(s) is not met and indication stops in step 117 if said limit value(s) is met. Alternatively, in step 116 the process continues to step 111 if any exposure still exist and indication stops in step 117 if no exposure exists anymore.

Figure 8:
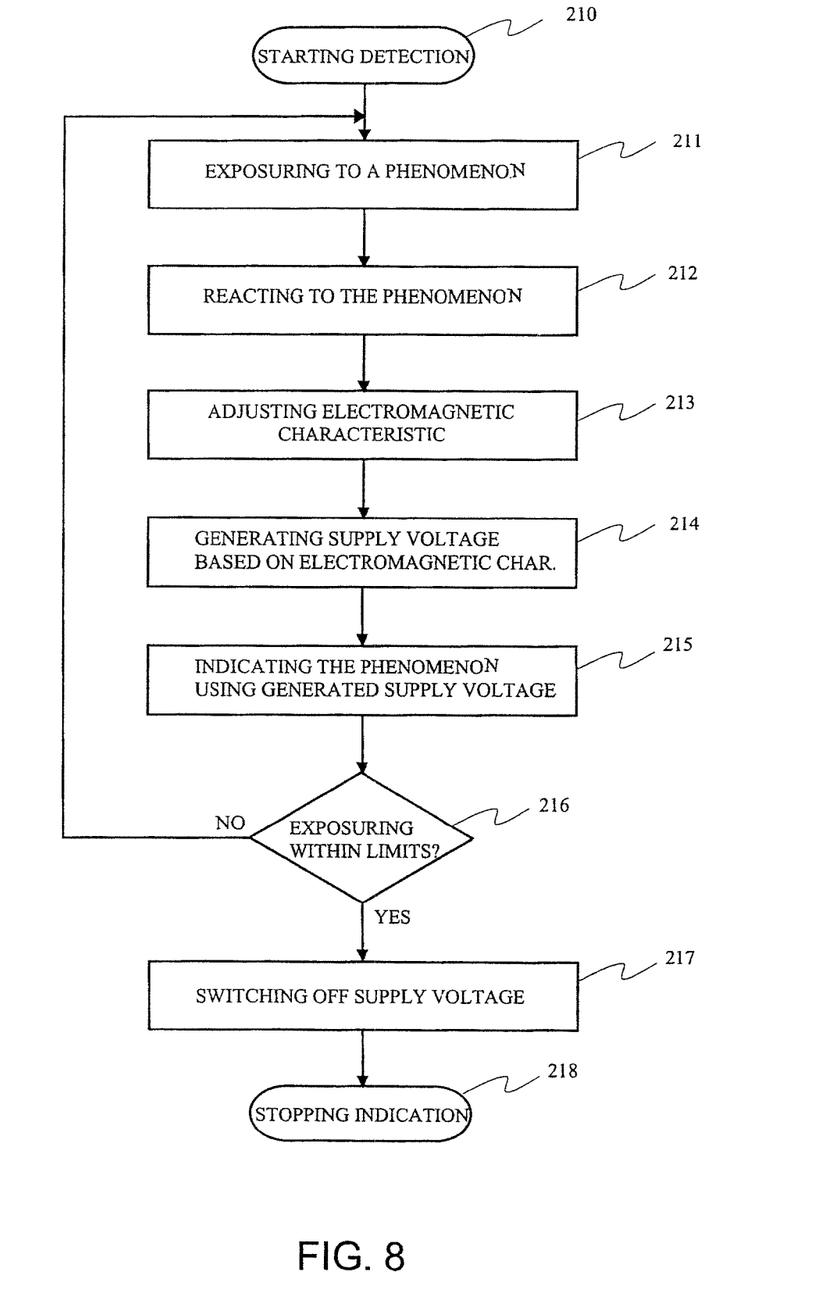
FIG. 8 depicts a flow diagram of another embodiment of a method according to the invention.

FIG. 8 shows a flow chart of a method according to an embodiment for providing detection of an exposure to a physical or chemical phenomenon and revealing information as a response to the exposure. Step 210-213 are similar to steps 110-113 of FIG. 7 described above. In step 214 detection of the physical or chemical phenomenon based on the electromagnetic characteristic appears in a form that supply voltage is generated in the microfluidic device. In step 215 indication of the exposure to the physical or chemical phenomenon is started by supplying supply voltage to a indicator device being connected to the microfluidic device. There may be predetermined certain limit value(s) for the exposure to the physical or chemical phenomenon so that the exposure is ignored when its intensity is within said limit value(s). In step 216 the process continues to step 211 if said limit value(s) is not met. If said limit value(s) is met in step 216, then in step 217 supply voltage is not generated any more and supply of supply voltage is hindered. Thus in step 218 indication stops. Alternatively, in step 216 the process continues to step 211 if any exposure still exists and indication stops in step 118 if no exposure exists anymore.

The embodied invention offers the opportunity to develop indicators, for example, whose sensitivity is adjustable by mechanical, chemical and fluidistic activity combinations discussed earlier in separation in this description. The embodied invention has several options and combinations, which may include that e.g. the micro-channel and capillary effect can be done by heat-sensitive polymer, using electric field-sensitive polymer (polymer deforms solid and liquid in above phenomena, etc.). In general, the microfluidic device according to the invention may comprise a number of combinations of different smart polymers (physical and/or chemical response) and microchannels.

The present disclosure is to be considered as an exemplification of the principles of the invention and associated functional specifications of the materials for its construction and is not intended to limit the invention to the embodiments illustrated. Various other embodiments of the invention will be apparent to persons skilled in the art upon reference to this description. It is therefore contemplated that the appended claims will cover any such modifications of the embodiments as fall within the true scope of the invention.

The invention claimed is:
1. A microfluidic device comprising:
a microchannel filled at least partly with at least one substance
that has an initial state before an exposure to a stimulus of a mechanical, chemical, or environmental phenomenon, wherein the initial state is one of solid, gelatinous, or fluidic state, and
a conductor providing an intersection area with the microchannel,
characterized in that
the exposure to a stimulus of a mechanical, chemical or environmental phenomenon directed to the microchannel or to the substance in the microchannel is arranged to cause the microchannel or substance in the microchannel to control electromagnetic characteristic of the conductor in the intersection area, and wherein upon the exposure the substance is arranged to change its state from the initial state to a changed state, which is one of solid, gelatinous, or fluidic state and other than the initial state.

2. The device of claim 1, wherein the substance is material forming at least part of the microchannel.

3. The microfluidic device of claim 1, wherein the microchannel and the conductor intersects so that in the intersection area at least part of the microchannel is arranged to be contiguous to the conductor before the exposure to the phenomenon.

4. The microfluidic device of claim 1, wherein upon exposure directed to the microchannel or to the substance in the microchannel the substance is arranged to change state or form so that the electromagnetic characteristic of the conductor changes.

5. The microfluidic device of claim 1, wherein upon exposure the substance is arranged to move along the microchannel to the intersection area so that the electromagnetic characteristic of the conductor changes in the intersection area.

6. The microfluidic device of claim 1, wherein upon exposure the substance is arranged to change state or form so that electrical conductivity, permittivity or permeability of the substance changes.

7. The microfluidic device of claim 1, wherein upon exposure the substance is caused to change conductivity of the conductor when the substance is in contact with the conductor.

8. A microfluidic device comprising:
a microchannel filled at least partly with at least one substance, and
a conductor providing an intersection area with the microchannel,
wherein as a result of exposure to a phenomenon directed to the microchannel or to the substance in the microchannel, the microchannel or substance in the microchannel is arranged to control electromagnetic characteristic of the conductor in the intersection area, and
wherein upon exposure the substance is caused to form an electrolyte being coupled to the conductor when the substance is in contact with the conductor.

9. The microfluidic device of claim 1, wherein upon exposure the substance is arranged to electrically connect or disconnect the conductor in the intersection area.

10. The microfluidic device of claim 1, wherein a first substance is material being capable of reacting with a second substance upon exposure to the phenomenon directed to the microchannel or the first or second substance.

11. The microfluidic device of claim 10, wherein the first substance comprises porous material being capable of reacting with the second substance.

12. The microfluidic device of claim 1, wherein the substance is arranged to act between two conductors when upon exposure the substance fills a space between the two conductors in the intersection area.

13. The microfluidic device of claim 1, wherein the conductor provides the inter-section area with the microchannel so that the conductor is opened so as to form two conductor ends within the intersection area, the substance is arranged to act between the two conductor ends when upon exposure the substance fills a space between the two conductors ends within the intersection area.

14. An indicator device comprising:
the microfluidic device according to claim 1 being connected to means for indicating to indicate the exposure to the phenomenon by giving a visual, sound, scent and/or electrical indication.

15. An indicator device comprising:
a microfluidic device which comprises
a microchannel filled at least partly with at least one substance, and
a conductor providing an intersection area with the microchannel,
wherein as a result of exposure to a phenomenon directed to the microchannel or to the substance in the microchannel, the microchannel or substance in the microchannel is arranged to control electromagnetic characteristic of the conductor in the intersection area,
the microfluidic device being connected to means for indicating to indicate the exposure to the phenomenon by giving a visual, sound, scent and/or electrical indication, and
wherein the means for indicating is powered by electrical energy generated in the microfluidic device.

16. A method comprising:
Providing a the microfluidic device according to claim 1 comprising a conductor providing an intersection area with a microchannel, said microchannel being filled at least partly with at least one substance,
characterized in that the method comprises
detecting a mechanical, chemical or environmental phenomenon exposed to the microchannel and to the substance in the microchannel, and
causing upon exposure to a stimulus of the phenomenon directed to the microchannel and to the substance in the microchannel the microchannel or substance in the microchannel to act so as to control electromagnetic characteristic of the conductor in the intersection area.

17. The method of claim 16, which comprises changing state or form of the sub-stance in the intersection area upon exposure directed to the microchannel or to the substance in the microchannel.

18. The method of claim 16, which comprises indicating the exposure to the phenomenon by giving a visual, sound, scent and/or electrical indication.

19. A method comprising:
providing a microfluidic device comprising a conductor providing an intersection area with a microchannel, said microchannel being filled at least partly with at least one substance,
detecting a phenomenon exposed to the microchannel or to the substance in the microchannel, wherein as a result of exposure to the phenomenon directed to the microchannel or to the substances in the microchannel the microchannel or substance in the microchannel is caused to act so as to control electromagnetic characteristic of the conductor in the intersection area, and
which comprises generating supply voltage upon exposure to the phenomenon.

* * * * *